Patented Mar. 21, 1933 1,902,745

UNITED STATES PATENT OFFICE

ADOLF WINDAUS, OF GOTTINGEN, GERMANY, ASSIGNOR TO WINTHROP CHEMICAL COMPANY, INC., OF NEW YORK, N. Y., A CORPORATION OF NEW YORK

ANTIRACHITICALLY ACTIVE PRODUCT

No Drawing. Application filed June 24, 1931, Serial No. 546,662, and in Germany April 2, 1931.

The present invention relates to a new crystalline anti-rachitically active product and to a process of preparing the same.

It is known that by irradiating ergosterol by means of chemically active rays, especially the rays from the ultraviolet part of the spectrum, anti-rachitically highly active preparations are obtained. Care is, however, to be taken that the anti-rachitically active product formed is not destroyed again by excess irradiation.

My present invention provides a process by which the efficacy of the already highly active preparations thus obtained can be further improved by separating the anti-rachitically inactive parts and by which the anti-rachitically active substance can be obtained in a new, crystallized, form.

In accordance with my present invention the separation of the anti-rachitically inactive constituents depends on the fact that the same may be converted into addition compounds being insoluble in certain solvents, as for instance, petroleum ether, in contrast with the anti-rachitically active substance, by treating the product produced by irradiating ergosterol preferably with maleic acid anhydride or citraconic acid anhydride. But also other substances behaving in their additive power to conjugated double bonds as maleic acid anhydride and citraconic acid anhydride, which, therefore, must be considered equivalent to the said acid anhydrides in the present process, may be employed.

In accordance with my present invention the process of separating the inactive constituents is carried out by reacting upon the irradiation product of the ergosterol produced in the absence of oxygen and dissolved in an organic solvent being inert to the reacting components with a small excess of maleic acid anhydride preferably at room temperature that is a temperature of about 15° to about 25° C. until no further condensation occurs. This effect is achieved after standing for a prolonged time, say for at least 2 days at room temperature. Then a test portion of that part of the irradiation product which has not entered into reaction with the maleic or-citraconic acid anhydride, shows a rotatory power of about $[\alpha]_D + 50°$ in petrol ethereal solution. Hereafter the solvent is evaporated and the residue subjected to a saponifying process, for example, by dissolving in alcoholic caustic soda or potash. The solution is left standing for a prolonged time, say about 12 hours at room temperature. By this saponification process the excess maleic anhydride which has not been consumed for the addition reaction, and the esters, formed by reaction of the maleic anhydride with the hydroxy group still contained in the irradiation products of ergosterol and the maleic anhydride addition compound, are transformed into the corresponding salts which are insoluble in ether and/or petroleum ether. After the addition of water, the saponification mixture is shaken out repeatedly with ether and/or petroleum ether. The extract thus obtained contains that part of the irradiation product which does not react with the maleic or-citraconic acid anhydride. It is washed with water and dried in the customary manner. The residue remaining after distilling off the ether or petroleum ether displays a high anti-rachitical effect, whereas the product obtained from the above said addition compounds is anti-rachitically inactive.

The anti-rachitically highly active residue may be obtained by crystallizing, for example, from methylalcohol or acetone in white needles of the melting point of 120–121° C. Their composition corresponds to the formula $C_{28}H_{44}O$. Their solution in petroleum ether shows a rotatory power of $[\alpha]_D^{19} + 72.6°$, a 0.8% solution in acetone shows a rotatory power of $[\alpha]_D^{19} + 136.2°$, $[\alpha]_{Hg}^{19} + 168.1°$. The crystallized substance is not precipitated by digitonin. It shows the same color reaction as ergosterol only in a more weakened state. The absorption spectrum of the new crystallized product has a pronounced maximum at 265–270μμ. In order to obtain the crystalline product, it is advantageous to irradiate ergosterol to such an extent that only about 40–50% of the ergosterol charged into the reaction are changed by the irradiation process, likewise the use of ultraviolet light not containing wave lengths lower than 275μμ which may be obtained by filtering the ultraviolet light is to be preferred in this case.

The invention is illustrated by the following examples without being restricted thereto:

Example 1.—

A solution of ergosterol in benzene converted by means of irradiation with the light of an electric magnesium spark is freed from the solvent while excluding oxygen. The unchanged ergosterol is separated off in the manner known per se, for example, by cooling to a temperature below 0° C. whereby the unchanged ergosterol separates or by the known precipitation by means of digitonin.

The residue is mixed with a small excess of maleic acid anhydride, say for instance 1½ mol calculated upon 1 mol of the irradiation product is left standing in a benzene solution for 2 days at room temperature. After this time about 40% of the irradiation product freed from ergosterol have entered into reaction with the maleic acid anhydride. Hereafter the benzene is distilled off in vacuo, advantageously while carefully excluding atmospheric oxygen. The residue is dissolved in alcoholic potash lye, the solution left standing for about 12 hours at room temperature and after the addition of water repeatedly shaken out with petroleum ether. The petrolic ethereal extracts contain that part of the irradiation product which does not react with maleic acid anhydride. They are dried in the customary manner and evaporated. The residue is advantageously dissolved in vegetable oil in which the anti-rachitical vitamin is best protected against oxidation in the air.

Whilst those parts of the irradiation product converted with the maleic acid anhydride into addition compounds are anti-rachitically inactive, the parts not entered into reaction with the maleic acid anhydride are of a highly active anti-rachitical effect. They show a characteristic absorption spectrum with a maximum at 265–270 μμ. Contrary to the customary ergosterol irradiation products changing their absorption spectrum when heated up to a temperature of 100° C., the spectrum of the decided absorption maximum at 265–270μμ remains unchanged for the parts not reacting with maleic acid anhydride.

Example 2.—

An ethereal solution of ergosterol is irradiated in the customary manner in a quartz roller while completely excluding atmospheric oxygen with the light of an electric magnesium spark. A filter, consisting of a 0.005% solution of diphenyl or of an about 5% solution of benzene or xylene in benzine in a thin layer is introduced into the ray passage. When about 45% of the charged ergosterol are converted, the irradiation product is freed in the customary manner from the unchanged ergosterol and the product separating thereby is left standing in an ethereal solution with the same quantity of citraconic acid anhydride advantageously while excluding air, for about 10 days at 20–25° C. Preferably the citraconic acid anhydride is caused to react upon the irradiation product until a test portion of that part of the irradiation product not reacting with citraconic acid anhydride displays an optical rotatory power of about +50° C. in a solution of normal benzine. The solvent is then dispelled and replaced by methyl-alcohol. Hereafter 1½ times as much of the calculated quantity of potash lye are added and left standing for about 12 hours at room temperature. After the addition of the equal quantity of water the solution is shaken out with ether and petroleum ether. The extract is washed with water and the solvent evaporated. All working processes are advantageously carried out under the exclusion of atmospheric oxygen. From the residue thus obtained by treating with methyl-alcohol or acetone crystals of the anti-rachitically active transformation product of ergosterol are obtained, which after repeated recrystallization from the solvents mentioned above melt at 120–121° C. The solution in petroleum ether shows a rotatory power of $$[\alpha]_D^{19} + 72.6°,$$

a 0.8% solution in acetone shows a rotatory power of $$[\alpha]_D^{19} + 136.2°, [\alpha]_{Hg}^{19} + 168.1°.$$

The analysis corresponds to the formula $C_{28}H_{44}O$. The solution of the new crystallized product displays the absorption spectrum characterized in Example 1.

Instead of the above mentioned filter also uviolglass in connection with the quartz mercury vapor lamp or other similarly acting devices may be employed.

I claim:—

1. In the process of preparing anti-rachitically highly active transformation products of ergosterol which has been irradiated with ultra violet light not containing wave lengths below 275μμ, the steps which comprise reacting upon the irradiation product with an anhydride of the formula

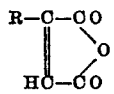

wherein R stands for hydrogen or alkyl during several days in the presence of an organic solvent being inert to the reacting components, subjecting the reaction mass to a saponifying process at room temperature, and extracting the reaction mass by means of an organic solvent.

2. In the process of preparing antirachitically highly active transformation products of ergosterol the steps which comprise reacting upon ultraviolet-irradiated ergosterol with maleic acid anhydride during about 2 days in the presence of an organic solvent being inert to the reacting components, subjecting the reaction mass to a saponifying process at room temperature, and extracting the reaction mass by means of an organic solvent.

3. In the process of preparing antirachitically highly active transformation products of ergosterol the steps which comprise reacting upon ultraviolet-irradiated ergosterol with maleic acid anhydride during about 2 days in the presence of an organic solvent being inert to the reacting components, saponifying the reaction mass obtained by a caustic alkali at room temperature, and extracting the reaction mass by means of an organic solvent.

4. In the process of preparing antirachitically highly active transformation products of ergosterol the steps which comprise reacting upon ultraviolet-irradiated ergosterol with maleic acid anhydride during about 2 days in a solution of benzene, evaporating the solvent and saponifying the residue obtained by an alcoholic caustic alkali solution at room temperature, then after diluting with water extracting the mixture with ether and/or petroleum ether.

5. In the process of preparing antirachitically highly active transformation products of ergosterol the steps which comprise reacting upon ultraviolet-irradiated ergosterol with maleic acid anhydride for about 2 days in a solution of benzene, evaporating the solvent and saponifying the residue obtained by an alcoholic caustic potash solution at room temperature, then after about 12 hours diluting with water and extracting with ether and/or petroleum ether.

6. In the process of preparing antirachitically highly active transformation products of ergosterol which has been irradiated with ultra violet light not containing wave lengths below 275µµ, the steps which comprise reacting upon the irradiation product with citraconic acid anhydride during about 10 days in the presence of an organic solvent being inert to the reacting components, subjecting the reaction mass to a saponifying process at room temperature, and extracting the reaction mass by means of an organic solvent.

7. In the process of preparing antirachitically highly active transformation products of ergosterol which has been irradiated with ultra violet light not containing wave lengths below 275µµ, the steps which comprise reacting upon the irradiation product with citraconic acid anhydride during about 10 days in the presence of an organic solvent being inert to the reacting components, saponifying the reaction mass obtained by a caustic alkali at room temperature, and extracting the reaction mass by means of an organic solvent.

8. In the process of preparing antirachitically highly active transformation products of ergosterol which has been irradiated with ultra violet light not containing wave lengths below 275µµ, the steps which comprise reacting upon the irradiation product with citraconic acid anhydride in a solution of ether, evaporating the solvent and saponifying the residue obtained by an alcoholic caustic alkali solution at room temperature, then after diluting with water extracting the mixture with ether and/or petroleum ether.

9. In the process of preparing antirachitically highly active transformation products of ergosterol which has been irradiated with ultra violet light not containing wave lengths below 275µµ, the steps which comprise reacting upon the irradiation product with citraconic acid anhydride for about 10 days in a solution of ether, evaporating the solvent and saponifying the residue obtained by alcoholic caustic potash solution at room temperature, then after about 12 hours diluting with water and extracting with ether and/or petroleum ether.

10. The process which comprises antirachitically activating ergosterol by irradiating with ultraviolet light not containing wave lengths below 275µµ, in the absence of oxygen and separating off the unchanged ergosterol in the manner known per se, treating the transformation product obtained with an anhydride of the formula

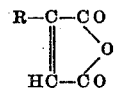

wherein R stands for hydrogen or alkyl in an organic solvent being inert to the reacting components for several days at room temperature, subjecting the reaction mixture to a saponifying agent and extracting, after the addition of water, the saponified mixture with an organic solvent and evaporating the solvent, always taking care that oxygen be excluded as much as possible.

11. The process which comprises antirachitically activating ergosterol by irradiating with ultraviolet light in the absence of oxygen and separating off the unchanged ergosterol in the manner known per se, treating the transformation product obtained with maleic acid anhydride for about 2 days at room temperature in an organic solvent being inert to the reacting components, saponifying the reaction mixture by the addition of a caustic alkali and extracting, after the addition of water, the saponified mixture with an organic solvent and evaporating the solvent, always taking care that oxygen be excluded as much as possible.

12. The process which comprises antirachitically activating ergosterol by irradiating with ultraviolet light in the absence of oxygen and separating off the unchanged ergosterol in the manner known per se, treating the transformation product obtained with maleic acid anhydride for about 2 days at room temperature in an organic solvent being inert to the reacting components, evaporating the solvent at a low temperature, taking up the residue in an alcohol, adding a caustic alkali and, after standing for a prolonged time, diluting with water and extracting with ether and/or petroleum ether and evaporating the solvent.

13. The process which comprises antirachitically activating ergosterol by irradiating ergosterol with ultraviolet light in the absence of oxygen to an extent that only about 40–50% of the ergosterol are changed by the irradiation and separating off the unchanged ergosterol in the manner known per se, treating the transformation product obtained with maleic acid anhydride for about 2 days at room temperature in an organic solvent being inert to the reacting components, evaporating the solvent at a low temperature, taking up the residue in an alcohol, adding a caustic alkali and, after standing for a prolonged time, diluting with water and extracting with ether and/or petroleum ether and evaporating the solvent.

14. The process which comprises antirachitically activating ergosterol by irradiating in the absence of oxygen ergosterol with ultraviolet light not containing wave lengths below $275\mu\mu$ to an extent that only about 40–50% of the ergosterol are changed by the irradiation and separating off the unchanged ergosterol in the manner known per se, treating the transformation product obtained with maleic acid anhydride for about 2 days at room temperature in an organic solvent being inert to the reacting components, evaporating the solvent at a low temperature, taking up the residue in an alcohol, adding a caustic alkali and, after standing for a prolonged time, diluting with water and extracting with ether and/or petroleum ether and evaporating the solvent.

15. The process which comprises antirachitically activating ergosterol by irradiating in the absence of oxygen ergosterol with ultraviolet light not containing wave lengths below $275\mu\mu$ to an extent that only about 40–50% of the ergosterol are changed by the irradiation and separating off the unchanged ergosterol in the manner known per se, treating the transformation product obtained with maleic acid anhydride for about 2 days at room temperature in a solution of benzene, evaporating the solvent at a low temperature, saponifying the residue with alcoholic caustic potash solution at room temperature, after standing for about 12 hours diluting the mixture with water and extracting with ether and/or petroleum ether, washing the extract obtained with water, drying the extract, evaporating the solvent and crystallizing the residue obtained from an alcohol.

16. The process which comprises antirachitically activating ergosterol by irradiating with ultraviolet light not containing wave lengths below $275\mu\mu$ in the absence of oxygen and separating off the unchanged ergosterol in the manner known per se, treating the transformation product obtained with citraconic acid anhydride for about 10 days at room temperature in an organic solvent being inert to the reacting components, saponifying the reaction mixture by the addition of a caustic alkali and extracting, after the addition of water, the saponified mixture with an organic solvent and evaporating the solvent, always taking care that oxygen be excluded as much as possible.

17. The process which comprises antirachitically activating ergosterol by irradiating with ultraviolet light not containing wave lengths below $275\mu\mu$ in the absence of oxygen and separating off the unchanged ergosterol in the manner known per se, treating the transformation product obtained with citraconic acid anhydride for about 10 days at room temperature in an organic solvent being inert to the reacting components, evaporating the solvent at a low temperature, taking up the residue in an alcohol, adding a caustic alkali and, after standing for a prolonged time, diluting with water and extracting with ether and/or petroleum ether and evaporating the solvent.

18. The process which comprises antirachitically activating ergosterol by irradiating ergosterol with ultraviolet light in the absence of oxygen to an extent that only about 40–50% of the ergosterol are changed by the irradiation and separating off the unchanged ergosterol in the manner known per se, treating the transformation product obtained with citraconic acid anhydride for about 10 days at room temperature in an organic solvent being inert to the reacting components, evaporating the solvent at a low temperature, taking up the residue in an alcohol, adding a caustic alkali and, after standing for a prolonged time, diluting with water and extracting with ether and/or petroleum ether and evaporating the solvent.

19. The process which comprises anti-rachitically activating ergosterol by irradiating in the absence of oxygen ergosterol with ultraviolet light not containing wave lengths below 275$\mu\mu$ to an extent that only about 40-50% of the ergosterol are changed by the irradiation and separating off the unchanged ergosterol in the manner known per se, treating the transformation product obtained with citraconic acid anhydride for about 10 days at room temperature in an organic solvent, evaporating the solvent at a low temperature, taking up the residue in an alcohol, adding a caustic alkali and, after standing for a prolonged time, diluting with water and extracting with either and/or petroleum ether and evaporating the solvent.

20. The process which comprises anti-rachitically activating ergosterol by irradiating in the absence of oxygen ergosterol with ultraviolet light not containing wave lengths below 275$\mu\mu$ to an extent that only about 40-50% of the ergosterol are changed by the irradiation and separating off the unchanged ergosterol in the manner known per se, treating the transformation product obtained with citraconic acid anhydride for about 10 days in a solution of ether, evaporating the solvent at a low temperature, saponifying the residue with alcoholic caustic potash solution at room temperature. after standing for about 12 hours diluting the mixture with water and extracting with ether and/or petroleum ether, washing the extract obtained with water, drying the extract, evaporating the solvent and crystallizing the residue obtained from an alcohol.

21. As a new product the new crystalline anti-rachitically highly active transformation product of ergosterol, having the probable formula $C_{28}H_{44}O$, forming white crystals of the melting point 120-121° C., showing a rotatory power $[\alpha]_D^{19} + 72.6°$ in solution of petroleum ether, $+136.2°$ in a solution of acetone, $[\alpha]_{Hg}^{19} + 168.1°$ in a solution of acetone, being insoluble in water, soluble in organic solvents, having an absorption spectrum with a pronounced maximum at 265-270$\mu\mu$ and being not precipitated by digitonin from its solution.

In testimony whereof, I affix my signature.

ADOLF WINDAUS.